Mar. 3, 1925.

N. A. HENDERSON

MILK BOTTLE AND CREAM SEPARATOR FOR USE THEREWITH

Filed April 16, 1921

1,528,480

Inventor
Norman A. Henderson
by Alfred E. Baker
Atty.

Patented Mar. 3, 1925.

1,528,480

UNITED STATES PATENT OFFICE.

NORMAN A. HENDERSON, OF ALBANY, NEW YORK, ASSIGNOR, BY DIRECT AND MESNE ASSIGNMENTS, TO CREAM TOP BOTTLE CORPORATION, A CORPORATION OF NEW YORK.

MILK BOTTLE AND CREAM SEPARATOR FOR USE THEREWITH.

Application filed April 16, 1921. Serial No. 461,928.

*To all whom it may concern:*

Be it known that I, NORMAN A. HENDERSON, a citizen of the United States, residing at Albany, in the county of Albany, State of New York, have invented certain new and useful Improvements in Milk Bottles and Cream Separators for Use Therewith, of which the following is a specification.

The present invention relates to milk bottles and cream separators for use therewith and has for its object to provide an improved form of bottle and a separator for use therewith whereby the cream after it has risen to the top of the bottle can be readily and efficiently separated from the skim milk.

For a consideration of what I believe to be novel and my invention, attention is directed to the accompanying description and the claims appended thereto.

Figure 1:
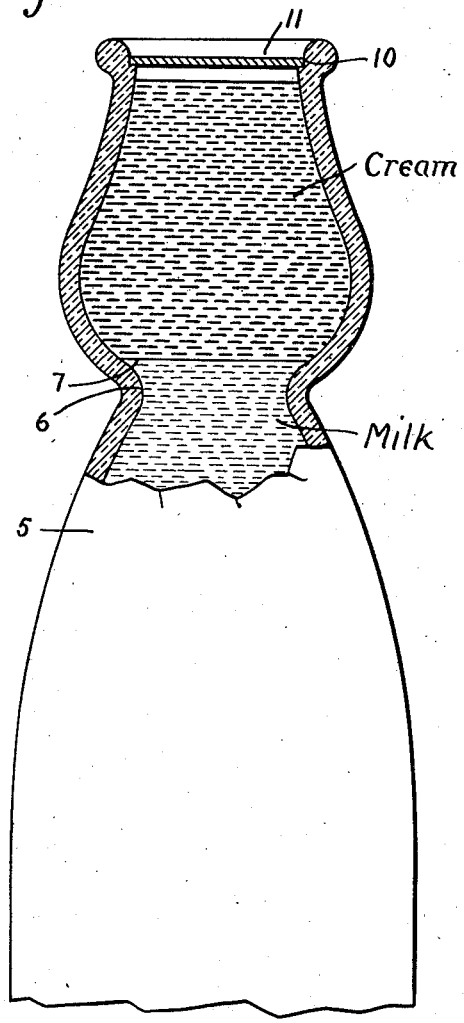
Figure 2:
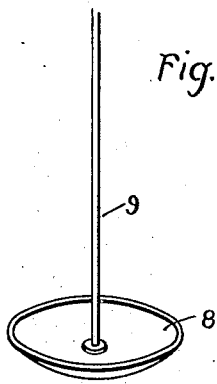
Figure 3:
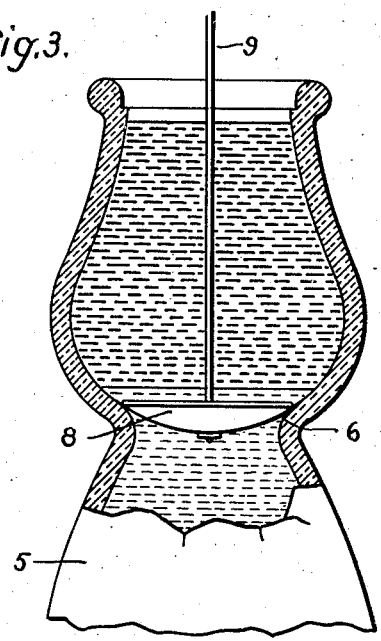

In the drawing, Fig. 1 is a side elevation partly in section of a milk bottle embodying my invention, the lower end of the bottle being broken away; Fig. 2 is a perspective view of a separator for use therewith, and Fig. 3 is a sectional view of the upper portion of the bottle showing the separator in place therein.

According to my invention, I provide a bottle 5 the neck of which is so shaped or has such a contour that it presents an internal shoulder or seat 6 at a point at or slightly below the cream line, which shoulder or seat is preferably of a diameter less than the mouth of the bottle at its narrowest diameter. It will be understood that by the term "cream line" I mean the point of separation between the cream and skim milk after the cream has risen to the top of the bottle. In Fig. 1 of the drawing this point is indicated at 7. The capacity of the portion of the bottle above seat 6 will vary according to the percentage of cream in the whole milk which the bottle is to contain. For example, for whole milk having about three per cent butter fat, the capacity of this portion should be about one-fifth the capacity of the bottle. For whole milk having a greater or lesser amount of butter fat the capacity above the seat will be varied accordingly. It is desirable to bring the cream line some distance down from the top of the bottle and to have not too great a bottle diameter at the cream line and preferably I form the bottle of about the contour shown so as to give it a pleasing apearance and at the same time bring the cream line the desired distance from the top of the bottle. It will be understood, however, that the bottle may have other suitable shape.

In order that it may be assured that all the cream will be removed from the milk, the arrangement will preferably be such that the cream line is slightly above seat 6. This means that some milk will be removed with the cream, a thing which is not objectionable and may be desirable. However, it will be understood that this is a matter of discretion and the arrangement may be such as to meet the requirements of any particular case.

For use in connection with the bottle, I provide a separator comprising a disk 8 carried by a handle 9. Disk 8 may be made of any suitable material such as rubber, or a metal and is of a diameter to pass through the mouth of the bottle and seat on shoulder 6. The disk may be made advantageously of rubber and be dished so that when pressed against the seat it will give somewhat and be compressed against the seat. It will thus form a tight seal and will be retained by suction. The handle is or may be fixed rigidly to the disk and is fastened in any suitable manner.

The top of the bottle is shown as being provided with the usual ledge 10 to receive the milk bottle cap 11.

In use the whole milk will be delivered in a bottle embodying my invention, the bottle being sealed in the ordinary manner with a cap placed on ledge 10. The user will be provided with a separator as shown in Fig. 2. When it is desired to take the cream from the top of the bottle, the cap is removed and the separator inserted through the neck of the bottle and brought into engagement with seat 6. The disk is made to enter the bottle edgewise or at an angle and is then turned to bring it flat. This avoids spilling or disturbing the cream. The disk when seated against seat 6 separates the cream from the milk and the cream may be poured off in an obvious manner.

It will be seen that by my invention I provide an arrangement whereby the cream may be easily removed from the top of the milk bottle without danger of spilling o. disturbing the cream. At the same tim the device is easy to use and requires no skill for its manipulation. The separator is of simple structure, easily kept clean and may be manufactured at a low cost and the milk bottle although of special shape, can be made as readily as the shapes now in common use and at no greater cost. Furthermore, my improved bottle will fit standard milk bottle cases now in common use and can be cleaned with standard equipment now in use for the common type of bottle. Also it can be filled and capped in standard filling and capping machines now in use for the common type of bottle. This means that my improved bottle can be used by a milk distributor without his having to change or discard any of his equipment, a thing which, as will be readily appreciated, is a matter of great importance.

Viewed from another aspect, it may be considered that my milk bottle comprises two portions, a cream portion and a milk portion, separated by a seat or shoulder, or, in other words, that the bottle is provided at about the cream line with a constricted portion, and I have found by experiment that by tipping the bottle I can pour the cream off quite satisfactorily without using a separator, as shown in Fig. 2. This is because the constriction serves to hold the cream from running back into the bottle as readily as it does in an ordinary milk bottle. At the same time it tends to prevent any milk running to the mouth of the bottle until the greater portion of the cream has been poured out. However, for best results it is preferable to use a separator.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent, is:—

1. A milk bottle having an upwardly facing internal seat spaced from its upper end by a distance such that the capacity of the portion of the bottle above the seat is about equal to the bulk of the cream contained in the whole milk with which the bottle is intended to be filled.

2. A milk bottle comprising a cream portion and a milk portion separated from each other by a passage which presents a seat of less diameter than the mouth of the bottle, said cream portion having a capacity to hold the cream contained in the milk with which the bottle is intended to be filled.

3. The combination with a milk bottle which presents an upwardly facing seat at approximately the cream line, of a separator adapted to pass through the mouth of the bottle and engage the seat to form a wall for separating the cream from the milk.

4. A milk bottle having an enlarged portion just below the mouth which forms a cream chamber and a portion below the cream chamber which forms a milk chamber, said cream chamber and milk chamber being connected by a passage of restricted area and said cream chamber having a capacity equal to about one-fifth the capacity of the bottle whereby it is adapted to hold the cream content of ordinary milk.

5. A milk bottle having a ledge at its mouth adapted to receive a milk bottle cap, an enlarged portion just below the mouth which forms a cream chamber having a capacity approximately equal to the amount of cream in the whole milk with which the bottle is to be filled, and a portion below the cream chamber which forms a milk chamber, said cream chamber and milk chamber being connected by a passage of restricted area which presents an upwardly facing seat adapted to receive a separator.

6. A milk bottle comprising a mouth provided with a ledge adapted to receive a milk bottle cap, an enlarged cream portion, and a milk portion, said cream portion having a capacity approximately equal to the amount of cream in the whole milk with which the bottle is to be filled, and said two portions being connected by a passage of restricted area, which presents an upwardly facing seat of less diameter than the mouth of the bottle.

7. A container for milk comprising a cream portion and a skim milk portion separated by a passage of restricted area which presents a seat for a separator, the cream portion having a capacity about equal to the bulk of the cream contained in the whole milk with which the container is intended to be filled.

8. A separator for use with a milk bottle having a cream portion and a skim milk portion separated by a passage of restricted area which presents an upwardly facing seat of less diameter than the mouth of the bottle, said separator comprising a disk adapted to be passed through the mouth of the bottle into engagement with said seat, and a rigid handle rigidly fixed to the disk and of such length as to project beyond the mouth of the bottle when the disk is seated.

In witness whereof, I have hereunto set my hand this 14th day of April, 1921.

NORMAN A. HENDERSON.